United States Patent [19]

Steidle

[11] 4,061,110
[45] Dec. 6, 1977

[54] APPARATUS AND METHOD FOR THE FARMING OF CLAMS

[76] Inventor: Wallace C. Steidle, Middle Line Highway, Water Mill, N.Y. 11976

[21] Appl. No.: 708,392

[22] Filed: July 26, 1976

[51] Int. Cl.² .......................................... A01K 61/00
[52] U.S. Cl. ................................................ 119/4
[58] Field of Search .......................... 119/2, 4, 34

[56] References Cited

U.S. PATENT DOCUMENTS

| 3,650,244 | 3/1972 | Fordham | 119/4 |
| 3,766,888 | 10/1973 | Wiegardt, Jr. | 119/4 |

FOREIGN PATENT DOCUMENTS 1,298,441  1/1972  United Kingdom ................ 119/4

Primary Examiner—Hugh R. Chamblee
Attorney, Agent, or Firm—Stanley Ira Laughlin

[57] ABSTRACT

Apparatus and method for the farming of clams comprising heavy trays preferably of concrete, which rest on the bottom land under the water and are stacked apart to allow the water to circulate above each tray. The trays are first filled with sand, in which the clams are placed, then covered with a layer of gravel to somewhat protect the clams from predators, as well as prevent the rapid current from shifting the sand.

3 Claims, 4 Drawing Figures

APPARATUS AND METHOD FOR THE FARMING OF CLAMS

BACKGROUND OF THE INVENTION

The invention relates to the animal husbandry field and more particularly to the efficient planting, cultivation and harvesting of clams.

The farming of clams is well-known, and it is customary for those engaged in this industry to lease land under water in which clams are embedded in the bottom sand and allowed to grow to maturity. With the increasing use of lands under the sea for mining and other uses coupled with the increase in the demand for clams, efficient methods for increasing the yield per unit area of land under the sea are absolutely necessary.

One method for increasing the yield of clams was claimed in U.S. Pat. No. 1,665,996 by R. C. Adams et al for the use of a protective cover of a mesh material that allowed water and natural food to enter, but protected the embryo clams from their natural enemies.

Seafood farming apparatus comprising mesh-enclosed trays was claimed by Ford in U.S. Pat. No. 2,989,945. However, Ford's trays were light so that the assembly could float in the water; employing anchors to prevent its drifting away.

Fischer in U.S. Pat. No. 3,316,881 claimed an artificial enclosure or cultch for farming of Oysters which was comprised of vertically stacked superimposed sheets.

A stackable array of mesh enclosed plastic trays that rested upon the ocean bottom was claimed by Herolzer in U.S. Pat. No. 3,702,599.

A float equipped cage for Shell-fish is claimed by Halaunbrenner in U.S. Pat. No. 3,741,159.

A tank for raising crustaceans is claimed by Day and Hirschman in U.S. Pat. No. 3,889,639.

It is an object of Applicant's apparatus and method to provide simple, safe and economical apparatus, and a method in conjunction thereof for farming clams.

It is a further object of Applicant's apparatus and method to provide means for farming clams in waters and navigable channels having rapidly flowing water currents, without the use of additional stabilizing equipment.

It is also a further object of Applicant's apparatus and method to more efficiently farm clams.

SUMMARY OF APPLICANT'S INVENTION

Applicant's invention relates to apparatus for farming clams and a method for employing said apparatus on lands beneath rapidly-moving waters. Weighted trays are stacked on the bottom lands in numbers determined by the depth of the water, rapidity of the currents and the ecology of the water. The method comprises covering a weighted tray area with a layer of sand in which claims are then embedded, and covering the sand with gravel.

The trays are then stacked and lowered in a supporting frame by means of a hoisting crane into position on the bottom land of the water.

BRIEF DESCRIPTION OF THE DRAWING

The following drawings illustrate one embodiment of Applicant's inventive apparatus and method for the farming of clams.

DETAILED DESCRIPTION OF THE INVENTION

Figure 1:
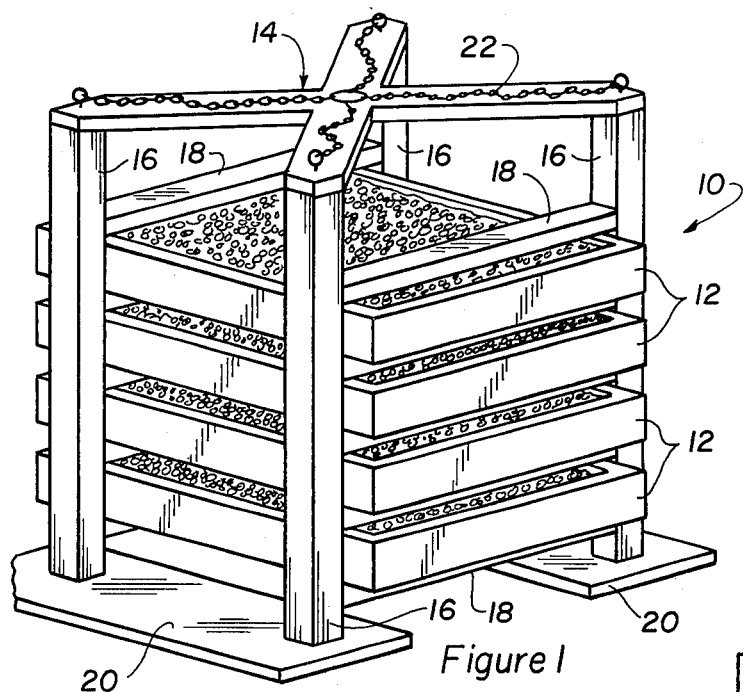
FIG. 1 is an isometric drawing of Applicant's inventive apparatus.

FIG. 1 shows Applicant's inventive apparatus 10 comprising an array of heavily weighted trays 12 which could be of any workable dimension, and positioned in supporting frame 14, comprising vertical upright members 16, cross members 18, and feet 20. The trays 12, as conceived in this invention are rectangular in shape; being approximately 10 feet in length and 5 feet in width with a depth of substantially 6 inches. The trays 12 are made of concrete of similar heavy weight material so as to be able to withstand rapidly changing water currents common to channels. The supporting frame 14 is made out of steel or other heavy-duty metal treated not only for withstanding submergence in sea water for long periods of time, but also for preventing the pollution of the waters proximate to the clams. A chain 22 is affixed to the cross members of Frame 14 for hoisting the apparatus 10 to a barge 30, shown in FIG. 4

Figure 2:
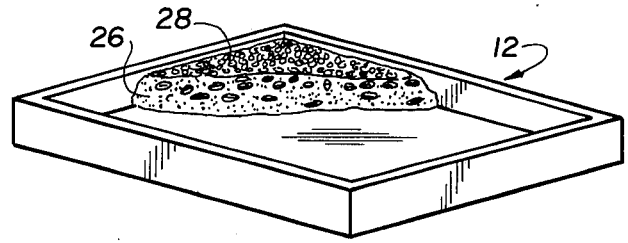
FIG. 2 is an isometric drawing of a portion of Applicant's apparatus as shown in FIG. 1.

FIG. 2 shows one of the trays 12 in detail. The sidewalls and bottom are slabs of concrete approximately 2 inches thick.

The method of farming the clams comprises the steps of placing a layer of sand approximately 2½ inches in depth in each tray, planting the clams in the sand in quantities of between 50 and 200 per square foot, spaced apart approximately 2 inches, between centers, and covering the sand in which the clams are embedded by a layer of gravel 26 approximately 1 inch in depth.

Figure 3:
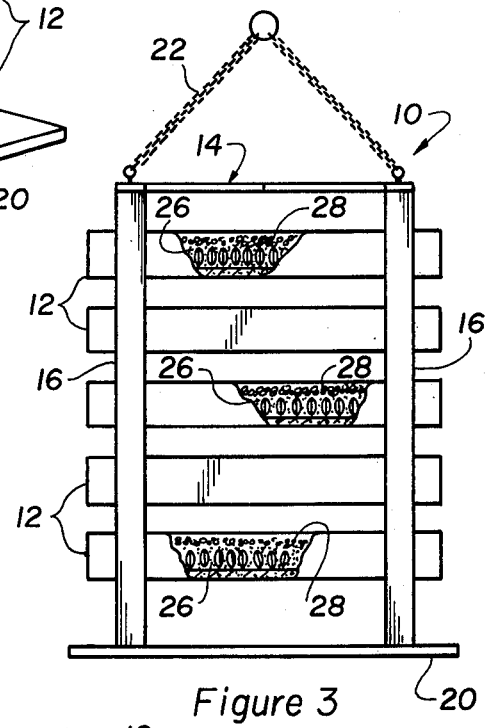
FIG. 3 is a partial side elevation drawing of Applicant's inventive apparatus as shown in FIG. 1.
Figure 4:
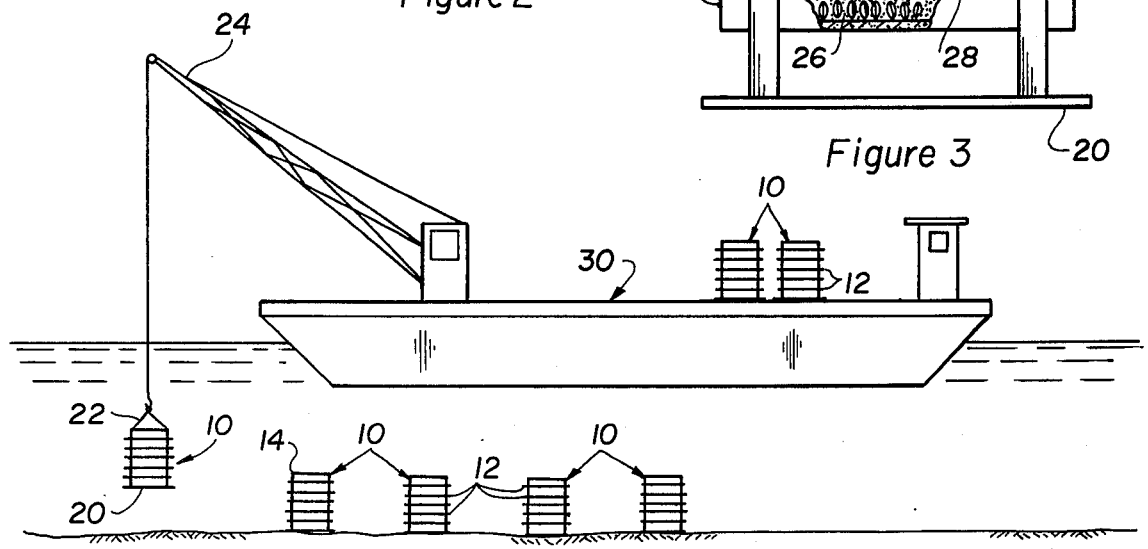
FIG. 4 is a symbolic representation of Applicant's apparatus operating in conjunction with conventional sea farming apparatus.

The prepared trays as shown in FIG. 3 are then fastened into the supporting frame 14 and lowered into position on the channel bottom by means of hoisting chain 22, and crane 24 as illustrated in FIG. 4. The number of trays stacked is between 3 and 5 depending upon the depth of the channel, so as not to interfere with navigation.

Applicant's apparatus and method will produce an efficient harvest of adult clams, because it cultivates the clam in an environment that is closest to his natural environment, sand; therefore, allowing him stability during his growing cycle without the expenditure of energy, thereby stunting his growth, to reposition himself, while yet protecting him from most predators. The gravel prevents the rapid current from shifting the sand, and does not prevent the desired movement of food or elimination of waste in the rapid current area around the clam.

The weight of the trays discourages pirating of the cultivated clams. The supporting fixture is not conducive to taking clams when all the trays are fastened into position.

The trays are then stacked in a supporting frame and lowered by means of a hoisting crane into position on the bottom land.

I claim:

1. Apparatus for the farming of clams in waters having rapidly flowing currents comprising a plurality of trays made of heavily weighted material having a generally rectangular bottom and 4 integrally interconnected side walls formed integrally with the bottom and extending vertically upward therefrom, a supporting frame having means for supporting said trays in a vertically spaced stacked relationship, base means on said supporting frame for standing upon bottom land below water and hoisting means attached with said supporting frame for raising said frame onto and off of said bottom land, each of said trays comprising a layer of sand in sufficient quantity to support clam life into which said clams are embedded, spaced apart from each other for growing, and a layer of gravel covering said layer of sand.

2. Apparatus as claimed in claim 1 wherein said trays are made of concrete.

3. Apparatus as claimed in claim 1 wherein said trays are made of fiber glass and ferro cement.

* * * * *